United States Patent [19]

Ouvrier

[11] 3,766,486

[45] Oct. 16, 1973

[54] ARRANGEMENT TO KEEP THE RANGE OF CONTROL OF A CONTROL ELEMENT WITHIN DESIRED LIMITS

[75] Inventor: Fritz Gunther Ouvrier, Tumba, Sweden

[73] Assignee: Telefonaktiebolaget L M Ericsson, Stockholm, Sweden

[22] Filed: June 12, 1972

[21] Appl. No.: 262,109

[30] Foreign Application Priority Data

June 21, 1971 Sweden .............................. 8028/71

[52] U.S. Cl. ....................... 330/52, 330/29, 330/132

[51] Int. Cl. ............................................... H03g 3/30

[58] Field of Search ........................ 330/29, 52, 132, 330/137

[56] References Cited

UNITED STATES PATENTS

| | | | |
|---|---|---|---|
| 3,302,175 | 1/1967 | Deracinois et al. | 330/52 X |
| 3,470,480 | 9/1969 | Smart et al. | 330/52 X |

*Primary Examiner*—Roy Lake
*Assistant Examiner*—James B. Mullins
*Attorney*—Hane, Baxley & Spiecens

[57] ABSTRACT

An arrangement to keep the range of control of a control element within desired limits especially for signal level regulation by means of a pilot signal, for example, in the repeaters of a carrier frequency system in which a control signal dependent on the amplitude of the pilot signal sets a control element which determines the amplification of the respective repeater. The arrangement controls the current which feeds the control element. The arrangement contains a first and a second parallel current branch each containing a voltage divider whose tap is connected to a definite potential through a Zener diode for limiting the current in either direction. The attenuation characteristic of the control element thus has two break points one in the lower part of the range of control and one in the upper part due to the current limitation and the amplification of the repeater becomes constant outside a range determined by the break points.

4 Claims, 6 Drawing Figures

ARRANGEMENT TO KEEP THE RANGE OF CONTROL OF A CONTROL ELEMENT WITHIN DESIRED LIMITS

The present invention relates to an arrangement to keep the range of control of a control element within desired limits especially for signal level regulation by means of a pilot signal, for example, in a carrier frequency system in which a control signal dependent on the amplitude of the pilot signal sets a control element.

Control systems comprising the above mentioned arrangement have certain troublesome drawbacks because in the most used technique a thermistor is employed as control element. Thus, the attenuation characteristic which can be achieved by means of the present technique is very dependent on the parameters of the individual thermistors. Because the thermistors have a very large distribution of parameters it is necessary to use a long and complex measuring-, sorting- and adjusting procedure in order to keep the individual characteristics within stipulated levels. For example, it turns out that with the known technique a quality demand concerning the maximum width of the range of control which is not to be exceeded is difficult to combine with the primary demand of the minimum width of the range of control which is always to be obtained.

The possibilities of sensing the attenuation at definite levels beyond the limits of the range of control by means of trigger circuits for alarm purposes for example will also be relatively small with the large uncertainty in the attenuation characteristic in this range.

An object of the invention is to provide an attenuation characteristic which can be actuated in such a way that the above mentioned difficulties and problems can be eliminated. This is obtained through bidirectionally limiting the current which feeds the control element, to give an attenuation characteristic having two break points one in the lower part of the range of control and one in the upper part. The attenuation characteristic outside the region determined by the break points accordingly becomes substantially linear, that is, the attenuation of the control element is constant. With the above described technique less critically selected thermistors can be used without any risk that the defined limit conditions be exceeded. In addition, the distance between the maximum and minimum width of the range of control can be reduced. Furthermore, with such an improved characteristic the relationship between the level of the pilot signal at the input and the level of the pilot signal at the output of the control system is more definite and therefore fixed alarm levels can be used. The control network according to the invention is defined by the appended claims.

Figure 1:
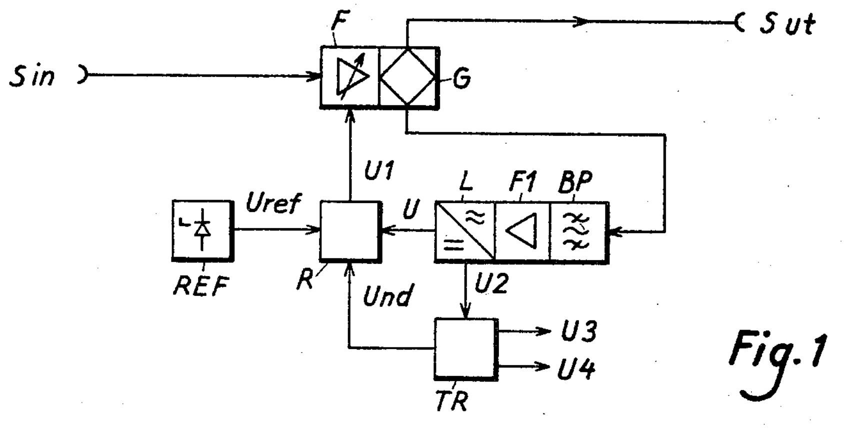
Figure 2:
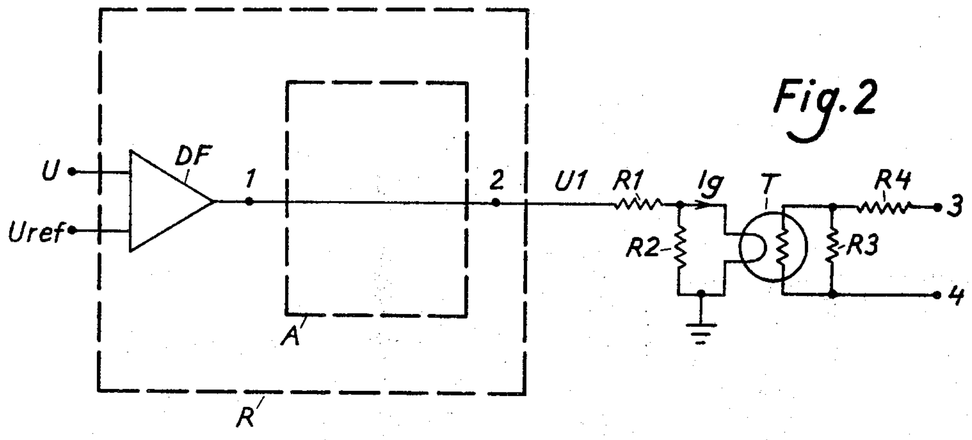
Figure 4:
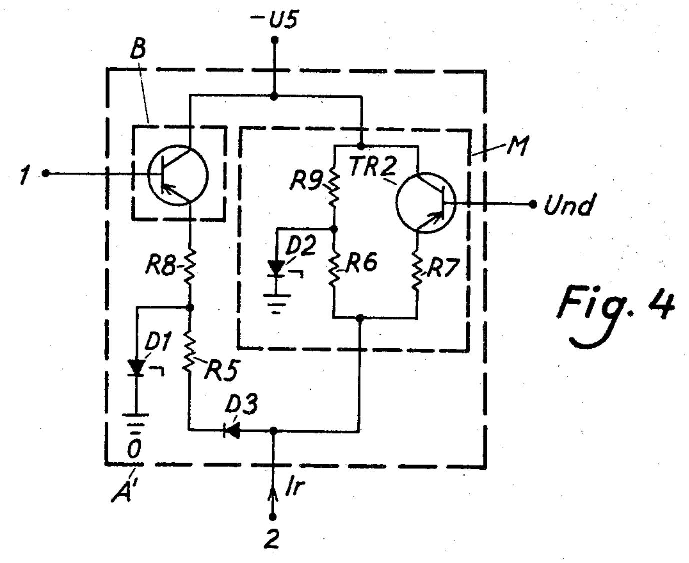
Figure 3:
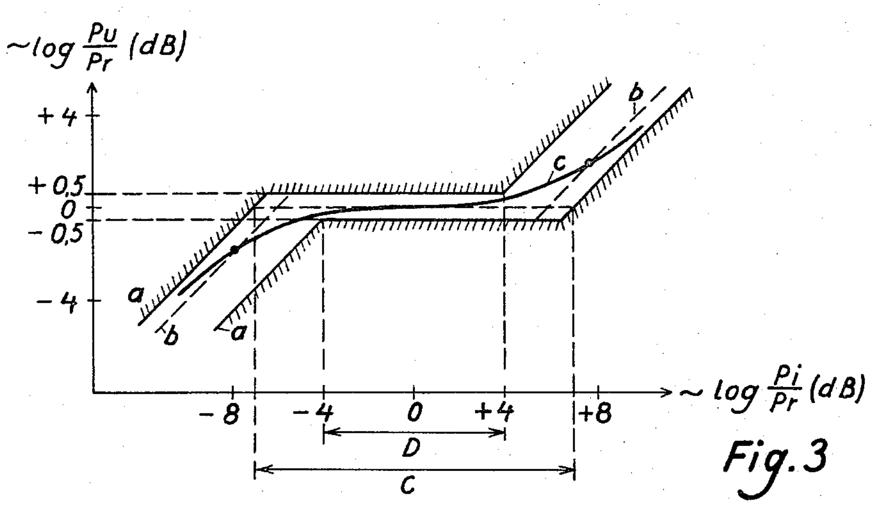
Figure 5:
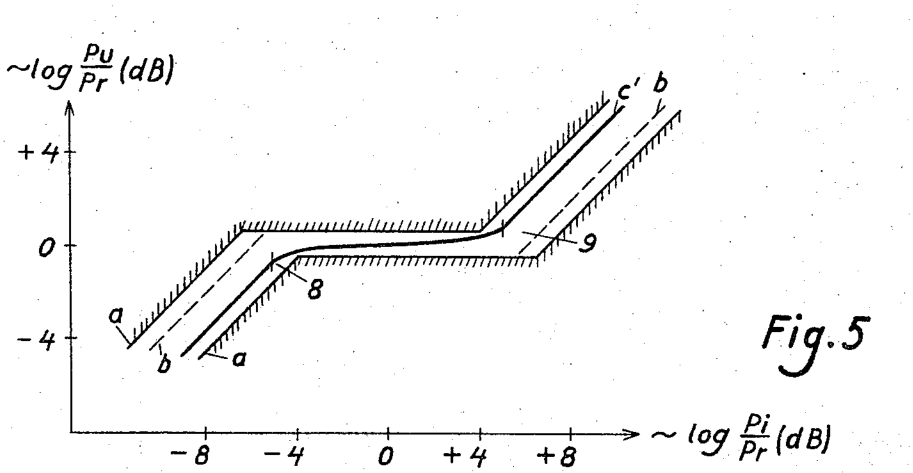
Figure 6:
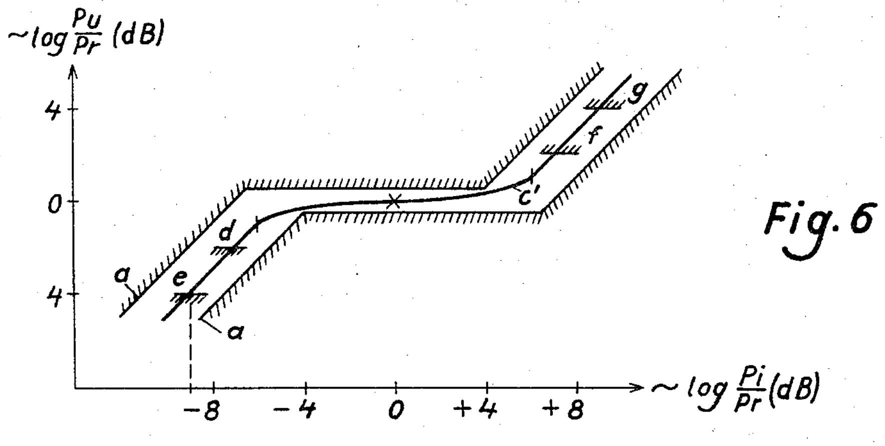

The invention will be described more in detail by means of an example in connection with the accompanying drawings where FIG. 1 shows a block diagram of the control system, FIG. 2 shows a control circuit with a control element in a known arrangement, FIG. 3 shows the relative pilot level after the control system as a function of the relative pilot level before the system in a known arrangement, FIG. 4 shows a control network according to the invention, FIG. 5 shows an example of an attenuation characteristic correctd by means of the invention and FIG. 6 shows a corrected attenuation characteristic with indicated alarm levels.

The block diagram in FIG. 1 shows a control amplifier F, G having an individual pilot receiver comprising elements BP, F1, L with the output signal U, the control circuit R with the output signal U1 and the reference voltage source REF which delivers the reference voltage Uref in a known arrangement. The amplification of the control amplifier F, G is controlled by means of a pilot signal with a frequency that equals the resonance frequency of the band pass filter BP of the pilot receiver. Within a certain range of the pilot signal level in the input signal Sin the level of the pilot signal in the output signal Sut is kept constant. This is all a known technique. Furthermore a voltage U2 is provided by the rectifier L, which voltage then is fed to a number of level sensing Schmitt-trigger circuits TR in order to be able to detect, for example, exceptionally high or low pilot signal levels and, if so desired, to give alarm signals U3, U4 with different priorities, etc. The voltage Und is generated by the unit TR when pilot signal is completely missed at the output of the amplifier FG because for example, a cable break or when the pilot signal is lower than a certain predetermined value. This function can be essential if, at the drop out of pilot signal several amplifiers connected in cascade should not be regulated to maximum amplification.

FIG. 2 shows a control circuit R with a connected control element, a thermistor T in a known arrangement. Between the points 1 and 2 there is a direct connection A which according to the invention will be replaced by a control network A'. An amplifier DF which amplifies the difference between the voltages U and Uref feeds directly the filament of the control element T. The points 3 and 4 are connected to two points in an attenuation network not shown in the figure, the attenuation of which defines the feedback and thus the amplification of the amplifier F. A change of the voltage U at the input side of the amplifier DF thus causes a change of the voltage at the point 1 which causes a change of the filament current I*g* of the thermistor and thereby a change of the temperature of the thermistor. By this temperature change a resistance change at the output side of the thermistor is obained which also influences the resistance between the points 3 and 4. Thus the attenuation in the attenuation network is changed as well as the amplification in the amplifier F. The resistors R1 and R1 are adjusted so that nominal attenuation for the control system corresponds to a certain given value of the current I *g* simultaneously as it is ensured that the input resistance of the control element seen from point 2 also assumes a desired value. The resistors R3 and R4 actuate the attenuation characteristic close to the limits of the range of control.

FIG. 3 shows the attenuation characteristic, that is, the relative pilot level after the control system as a function of the relative pilot level before the system in the described known arrangement. The curve is drawn for a conceivable case where the range of control is minimum ±4dB, range D, and maximum ±7dB, range C, and the control deviation in the range ±4dB is smaller than a prescribed value ±0.5dB, The limits between allowed and unallowed area for the characteristic are indicated by the lines *a*. P*u* and P*i* indicate the absolute pilot signal voltages at the output and input of the control system respectively and Pr is a reference voltage. If instead, the maximum for the range of control is ±6dB the limits a are replaced in their sloping parts by the limits *b*. The crossing points between the characteristic *c* and the limits *b* indicate the difficulty of keeping the characteristic within stipulated levels.

The resistors R3 and R4 according to FIG. 2 give a limited but not sufficient flexibility to shift the characteristic in the upper and lower part of the range of control in a desired direction.

FIG. 4 shows an example of a control network according to the invention which is intended to be inserted between the points 1 and 2 in FIG. 2. The voltage source −U5 drives the current I*r* through the thermistor T and the resistors R1 and R2. From FIG. 2 it is apparent that the filament current Ig of the thermistor is directly proportional to the current Ir. The current to the thermistor T from the voltage source −*U*5 flows through two parallel current branches one containing a resistance arrangement M and the other a current control element or current valving means B which for example can be a transistor connected in series with a voltage divider R8–R5. A switch TR2 which, for example, can be a transistor is, during normal operating conditions, blocked. If the state at the control electrode of the current control element B is such that this element is blocked current thus flows to the thermistor T only through the resistance arrangement M, the Zener-diode D2 together with the resistance R6 determine the amperage of this current by setting the voltage at the tap of the voltage divider R9– R6. This is the minimum value of the current I*r*. If now the state at the point 1 is changed so that the current control element B becomes more conductive the current I*r* increases simultaneously as a larger part of this current flows through the current control element B. The diode D3 insures that both current branches be independent of each other irrespectively of the type of the current control element B.

FIG. 5 shows the corrected characteristic *c'* with its break points 8 and 9 caused by the described current limitation. The linear parts of the characteristic have the gradient 45° which corresponds to constant attenuation for the control system. The figure also shows how the break points of the characteristic prevent the intersection of the characteristic with the lines b which correspond to ±6dB as upper limit of the range of control.

FIG. 6 shows the characteristic *c'* and its intersections with several defined levels *e*, *d*, *f* and *g*. The crossing point between the characteristic and the level e for an incoming relative pilot level equal to −9dB illustrates that a Schmitt-trigger circuit included in the unit TR according to FIG. 1 which senses the pilot level at the output of the amplifier F is actuated at this level and causes the voltage Und to be applied to the control electrode of the switch TR2, The switch TR2 reverses from blocked to conducting state. Causing the resistor R7 to be switched in between the voltage source −U5 and the point 2 according to FIG. 4 and the current through the control element changes from its minimum value to a value which is determined by the resistor R7. This value is so chosen that the resulting current through the control element corresponds to nominal attenuation of the control system. In an analogous way, the intersections of the characteristic with the other levels are utilized for, for example, alarm- or other signalling purposes.

The break points of the characteristic obtained by the invention can be expected to have a very good stability since they only depend on the properties of the Zener diodes and the temperature stability of the thermistor at the corresponding filament currents. Several practical experiments have been made, the result of which shows that the above declared expectations can be completely fulfilled.

We claim:

1. Apparatus for limiting the range of operation of a current-sensitive control element which regulates the level of a signal, said apparatus comprising: a current source having an output terminal and a return terminal, one of said terminals being connected to said current-sensitive control element; and first and second current control circuits connected in parallel between the other terminal of said current source and said current-sensitive control element, said first current control circuit comprising first and second resistors connected in series and a Zener diode connected between the junction of said resistors and a terminal of said current source to establish a fixed potential at said junction for stabilizing the minimum current through said circuit, to said current-sensitive control element, said second current control circuit comprising current valving means for controlling the flow of current therethrough in accordance with the amplitude of the signal whose level is to be regulated, third and fourth resistors, said current valving means, said third resistor and said fourth resistor being connected in series, and another Zener diode connected between the junction of said third and fourth resistors and a terminal of said current source for shunting current around said current-sensitive control element to establish a maximum limit for current passing through said circuit to said current-sensitive control element.

2. The apparatus of claim 1 further comprising an isolation means in at least one of said current control circuits for isolating the effect of current in one of said current control circuits on the other of said current control circuits.

3. The apparatus of claim 1 further comprising a third current control circuit connected in parallel with said first current control circuit, said third current control circuit comprising a signal amplitude sensitive switch means and a fifth resistor connected in series, said signal amplitude sensitive switch means switching to a conductive state when the amplitude of the signal whose level is being regulated falls below a predetermined value.

4. The apparatus of claim 3 further comprising an isolation means in said first current control circuit for isolating the effect of current in one of said current control circuits on the other current control circuits.

* * * * *